(12) United States Patent
Köblitz et al.

(10) Patent No.: US 6,652,932 B1
(45) Date of Patent: Nov. 25, 2003

(54) MOLDING WITH CONNECTION ELEMENT

(75) Inventors: Thomas Köblitz, Dietersheim (DE); Anneliese Kesselring, Markt Taschendorf (DE); Norbert Kaiser, Markt Taschendorf (DE)

(73) Assignee: Apack AG fur biologische Verpackungen, Markt Erlbach (DE)

( * ) Notice: Subject to any disclaimer, the term of this patent is extended or adjusted under 35 U.S.C. 154(b) by 38 days.

(21) Appl. No.: 09/686,890

(22) Filed: Oct. 12, 2000

(30) Foreign Application Priority Data

Jun. 29, 2000 (DE) .......................... 100 31 630

(51) Int. Cl.[7] .................. B29D 22/00; B29D 23/00; B32B 1/08; E05D 1/00; E05D 15/50

(52) U.S. Cl. .................. 428/34.1; 428/36.4; 428/36.5; 16/225; 16/231; 16/232; 902/14; 902/15

(58) Field of Search .................. 428/34.1, 36.4, 428/36.5; 16/225, 231, 232; 402/14, 15; 220/4.23

(56) References Cited

U.S. PATENT DOCUMENTS

| | | | | |
|---|---|---|---|---|
| 2,915,214 A | * | 12/1959 | Frankel | |
| 3,043,354 A | * | 7/1962 | Fitzgerald | |
| 5,156,267 A | * | 10/1992 | Yates, Jr. et al. | 206/364 |
| 5,376,320 A | | 12/1994 | Tiefenbacher et al. | 264/50 |
| 5,716,675 A | * | 2/1998 | Andersen et al. | 427/384 |
| 5,776,388 A | | 7/1998 | Andersen et al. | 264/45.5 |
| 5,843,544 A | | 12/1998 | Andersen et al. | 428/36.5 |
| 5,849,152 A | * | 12/1998 | Arnold et al. | 162/116 |
| 6,030,673 A | * | 2/2000 | Andersen et al. | 428/36.4 |

* cited by examiner

Primary Examiner—Harold Pyon
Assistant Examiner—Patricia L. Nordmeyer
(74) Attorney, Agent, or Firm—Fitzpatrick, Cella, Harper & Scinto

(57) ABSTRACT

The invention relates to a biologically degradable molding based on a starch-containing composite material and having at least two mold elements connected to one another by at least one connection element wherein the connection element extends substantially two-dimensionally and is connected at each of two mutually opposite end areas to a mold element, wherein the connection element comprises a first outer face and a second outer face, is made of a starch-containing and flexible composite material and is free of notch or fold depressions or cutouts.

21 Claims, 2 Drawing Sheets

MOLDING WITH CONNECTION ELEMENT

BACKGROUND OF THE INVENTION

1. Field of the Invention

The invention relates to a biologically degradable molding based on a starch-containing composite material and having at least two mold elements connected to one another by at least one connection element.

2. Description of the Related Art

U.S. Pat. No. 5,843,544 discloses a molding manufactured with the use of a starch-containing mixture. Said molding is provided with a hinge, wherein the hinge consists of a starch-containing cellular matrix. According to the teaching of U.S. Pat. No. 5,843,544 the hinge must comprise at least one notch or one fold in the hinge area, in order to permit a turning down or flexing of the hinge along the notch or the fold.

The hinge according to U.S. Pat. No. 5,843,544 exhibits, because of the notch or the fold, a reduced thickness in this area of the hinge, in order to reduce the stresses occurring on the inside of the hinge during the turning down or flexing.

It is disadvantageous, however, that said hinge breaks or tears easily along the notch provided or the fold.

In order to counteract this problem, according to the teaching of U.S. Pat. No. 5,843,544 a polyol-containing plasticiser such as glycerol, polyethylene glycol, propylene glycol or polypropylene glycol is applied to the hinge area.

The hinge known from U.S. Pat. No. 5,843,544 therefore has several disadvantages. First of all, the construction of the hinge with one or more notches or one or more folds is cumbersome. In particular, in the manufacture of large quantities of such hinges, such as are involved for example in the case of one-trip containers such as starch-based hamburger cases, it is difficult to manufacture such cumbersomely formed hinges with a high throughput. According to the teaching of U.S. Pat. No. 5,843,544 the baking mold is in the area in which the hinge area is baked preferably provided with a material with lesser heat capacity or with a poorer heat transfer power. Baking molds of this kind are difficult to manufacture and fault-prone in permanent operation.

It is also disadvantageous that there have to be applied to the hinges known from U.S. Pat. No. 5,843,544 in a further processing step polyol-containing plasticisers, in order to be able to ensure adequate stability of the hinge. Said additional processing step is cumbersome and requires additional equipment. This makes it more expensive, for example, to manufacture mass-produced articles such as hamburger cases, which however have to be produced cheaply in order to be able to compete with the conventional hamburger cases based on polystyrene.

SUMMARY OF THE INVENTION

The object of the present invention is therefore to produce biologically degradable moldings which prevent the disadvantages known in the prior art and comprise a connection element which is simple to manufacture and possesses high flexibility.

The object on which the invention is based is achieved by the production of a biologically degradable molding based on a starch-containing composite material and having at least two mold elements connected to one another by at least one connection element, wherein the connection element extends substantially two-dimensionally and is connected at each of two mutually opposite end areas to a mold element, wherein the connection element comprises a first outer surface and a second outer surface, is manufactured from a starch-containing and flexible composite material and is free of notch- or fold-type depressions or cutouts.

BRIEF DESCRIPTIONS OF THE DRAWINGS

DETAILED DESCRIPTION OF THE PREFERRED EMBODIMENTS

Figure 1:
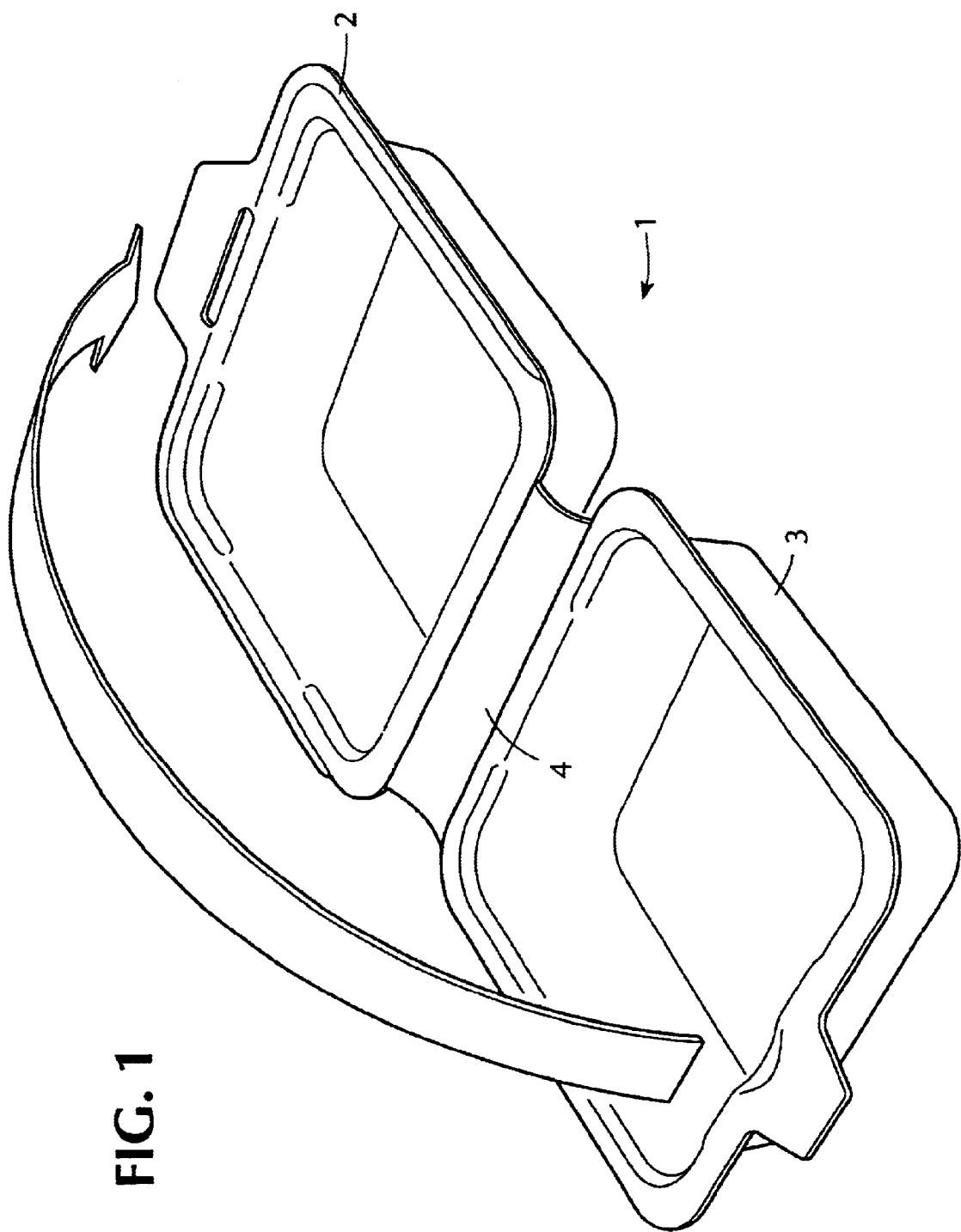
FIG. 1 depicts two mold elements connected by a connection element constructed as a container according to an embodiment of the invention.

The term biologically degradable moldings includes containers such as for example plates, cups, tumblers, hamburger cases, bowls, etc., which are provided for example with a cover such as a lid, wherein the cover is connected to the container by at least one connection element. Said moldings are manufactured from a bakeable material which includes starch. The bakeable material usually includes biologically degradable fibers and water, and may optionally include additives such as for example protein, fillers, fluxes, dyes, etc.

The bakeable material is then baked to a molding in honeycomb molds known per se from honeycomb baking technology. The honeycomb mold here possesses a shape which matches the molding to be manufactured. The baking process lasts some 10 to 100 seconds, preferably 60 seconds, at a temperature of 100 to 200° C., preferably at 150° C. in the closed baking mold.

There is meant by the term "flexible" for the purpose of the invention that the connection element may be bent or folded without a tearing or rupturing of the connection element occurring. During the bending operation a kink formation may occur in the connection element. Said kinking does not however take place at a predetermined point, but is fortuitous and depends substantially on the chosen length of the connection element. Preferably according to the invention the formation of a kink does not occur in the connection element during use.

For the purpose of the invention there is understood by the term "starch" natural starch, chemically and/or physically modified starch, industrially produced or genetically modified starch and mixtures thereof. The starch used may be cereal starch which is obtained for example from maize, waxy maize, wheat, barley, rye, oats, millet, rice, etc. or cassava or sorghum. Use may naturally also be made of the starch contained in legumes such as beans or peas or the starch contained in fruits such as for example chestnuts, acorns or bananas. The starch obtained from roots or tubers is also usable.

Potato starch is particularly suitable. Advantageously potato starch contains one phosphoric ester group for every 200 to 400 anhydroglucose units. The negatively charged phosphate groups are here connected to the C6 position of the anhydroglucose unit. During the production of a bakeable material the negatively charged phosphate groups cause by virtue of the mutual repulsion a disentangling of the individual potato-amylopectin molecules. By virtue of the mutual repulsion of the negatively charged phosphate groups the branchings of the amylopectin molecules are present largely unfolded or stretched out. This presence of esterified phosphate groups produces a high viscosity of potato starch-water mixtures.

By the term "biologically degradable fiber material" are meant in particular vegetable and animal fibers. There are used as vegetable fibers in accordance with the invention preferably cellulose-containing fibers. Cellulose-containing fibers are here fibers of any kind which contain cellulose or consist of cellulose. By animal fibers are meant so-called protein fibers such as for example wool, hairs or silks.

Use is particularly preferably made of vegetable fibers which may be present in different lengths and widths. There are used in particular vegetable fibers which have a length in the range from about 50 µm to about 3000 µm, preferably from about 100 µm to about 2000 µm, more preferably from about 150 µm to about 1500 µm, even more preferably from about 200 µm to about 900 µm, most preferably of all from 300 µm to about 600 µm. The width of the vegetable fibers may lie in a range from about 5 µm to about 100 µm, preferably from about 10 µm to about 60 µm, particularly preferably from about 15 µm to about 45 µm. The fibers are produced mainly from wood, hemp or cotton. Such fibers may be produced in a manner known to one of ordinary skill in the art.

Furthermore, the biologically degradable moldings based on a composite formed of starch and biologically degradable fiber material may also contain protein.

By the term "protein" are understood biopolymers based on amino acids. There are considered here as amino acids all so-called proteinogenic amino acids, i.e. the amino acids conventionally involved in protein synthesis, and also the so-called non-proteinogenic amino acids which are conventionally not involved in the synthesis of proteins.

By the term "protein" are understood also peptides or polypeptides. In addition, the term "protein" includes for the purpose of the invention naturally occurring protein, chemically modified protein, enzymatically modified protein, recombinant protein, protein hydrolysates or mixtures thereof. The protein may be of vegetable or animal origin here.

A bakeable material (baking material, dough) which includes starch, biologically degradable fiber material, protein and water permits, surprisingly, a shortening of the baking time of up to 35%, preferably up to 50%, compared with a bakeable material without the use of protein. Furthermore, the use of protein permits a reduction of the material requirement during the manufacture of moldings of up to 10 wt. % to 20 wt. %.

For example, use may be made as protein of proteins of animal origin such as, for example, actin, myoglobin, myosin, haemoglobin, collagen, elastin, immunoglubolins, keratins, fibroin, conchagens, ossein, albumins, caseins, fish protein concentrate(FPC). In addition, casein, alkali caseinate, earth-alkaline caseinate, casein hydrolysate and mixtures thereof may be used.

Use may be made of proteins of vegetable origin of prolamins such as e.g. gliadin, secalin, hordein, zein, as well as maize and soya protein. Soya protein in particular has proved to be extremely suitable. Furthermore, soya protein is extremely advantageously available cheaply and in large amounts commercially.

Preferably hydrophobic proteins are used as proteins. Hydrophobic proteins are here characterised by a high proportion of uncharged amino acids in the amino acid sequence. In particular said proteins contain high proportions of glycine, alanine, valine, leucine, isoleucine, phenylalanine, tryptophane, proline and methionine, wherein the latter bestow on the protein overall a hydrophobic character.

It is clear to one of ordinary skill in the art that the proteins listed above are only an exemplifying selection to illustrate the invention. Further proteins or protein mixtures may naturally also be used. The main criterion is that in view of the very large numbers of moldings that have to be produced the price of the protein or the protein mixture to be used is low.

A molding produced with the use of a protein-containing bakeable material exhibits a more continuous surface. A more continuous surface is of advantage in particular in terms of the ability of the molding to be thermally isolated.

Furthermore the bakeable material may additionally incorporate additives. It is possible by means of said additives to influence the properties of the biologically degradable molding produced. For example, hydrophobic agents, whiteners, food colours, aromatic substances etc. may be included in the bakeable material as additives.

The term "additive" includes here any compounds which are capable of influencing the product properties of the molding. Preferably said additives are completely or substantially completely biologically degradable. Preferred examples of said additives are hydrophobic agents, whiteners, dyes, food colours, aromatic substances etc.

Hydrophobic agents are components which bestow hydrophobic properties on the molding produced. Whiteners are compounds which are used to lighten the colour of the moldings. There are employed as dyes for example blue dyes, which are used for example to colour fruit bowls or fruit carriers. The following blue dyes may for example be used: natural colours or colours converted into a lake. Green dyes are for example also employed, which are used to colour bowls for holding plants. The following green dyes may for example be used: natural colours or colours converted into a lake.

Food colours are dyes used for the colour design of the packaging of foodstuffs. There may be used as an aromatic substance for the purpose of the invention any in particular biologically degradable aromatic substance which bestows for example on the molding produced a particular smell and/or taste.

Fluoroalkyl polymers are a particularly preferred example of hydrophobic agents, wherein the term "fluoroalkyl polymers" indicates that polymers are involved which are constructed of in particular recurring alkyl units, wherein one or more, optionally even all, hydrogen atoms may be replaced by fluorine atoms. For example, a hydrophobic agent based on a perfluroalkyl acrylate copolymer may be used.

The whitener may be a compound having at least one disulfone group. Such compounds are extremely well known to the relevant artisan of ordinary skill in said technical field. An example of such a disulfonic acid compound is 4,4'-bis (1,3,5-triazinylamino) stilbene-2,2'-disulfonic acid.

By the term "bakeable material" is understood a bakeable material or a dough which may be baked in baking devices known from honeycomb baking technology, such as e.g. baking tongs, with the formation of a molding. The bakeable material is for example placed in a heated baking mold of such a known baking device, whereupon the bakeable material spreads out in the baking mold and fills the latter completely. The bakeable material present in the baking mold gives off, when subjected to heat, water or water vapour, which leaves the baking mold through outlet channels provided. During this operation the solidification of the bakeable material takes place, with the production of the desired molding.

Preferably the bakeable material contains about 3 wt. % to about 15 wt. %, preferably about 5 wt. % to about 10 wt. %, most preferably 7.8 wt. % to about 9.8 wt. % of biologically degradable fiber material, preferably cellulose-containing fibers.

Furthermore the bakeable material preferably contains about 6 wt. % to about 30 wt. %, preferably about 10 wt. % to about 25 wt. %, most preferably about 16.1 wt. % to about 20.05 wt. % of native starch.

In addition the bakeable material preferably contains about 2 wt. % to about 10 wt. %, preferably about 4 wt. % to about 8 wt. %, most preferably about 5.4 wt. % to 6.8 wt. % of pre-gelatinized starch.

Furthermore the bakeable material preferably contains about 45 wt. % to about 90 wt. %, preferably about 60 wt. % to about 80 wt. %, even more preferably about 60 wt. % to about 75 wt. %, most preferably of all about 63 wt. % to about 71 wt. % of water.

Protein is preferably contained in the bakeable material in an amount of up to 10 wt. %, preferably up to about 5 wt. %, even more preferably up to about 3 wt. % of protein, most preferably of all up to about 2 wt. %.

The above figures in per cent by weight are referred in each case to the total weight of the bakeable material.

A grease-containing release agent may be added during the preparation of the bakeable material. It is naturally also possible, however, to add the grease-containing release agent directly into the baking mold directly prior to the baking operation.

The biologically degradable Moldings produced according to the above explanations comprise a fiber material-starch composite or, if protein is used, a fiber material-starch-protein composite.

The inventors have surprisingly found that if a two-dimensional connection element is used, which may be for example of strip- or ribbon-type construction, the cumbersome arrangement of a hinge with the use of notches and/or folds may be dispensed with.

With the molding according to the invention the connection element is therefore during use, i.e. the opening and closing of a molding incorporating a container and cover, preferably not turned down or flexed, but bent continuously, for example in the form of a bow or loop. Because of the astonishing flexibility of such a two-dimensional connection element the mold elements connected to one another by means of the connection element, such as the two halves of a hamburger case, are closed without the connection element rupturing or tearing.

Extremely advantageously the at least two mold elements of a biologically degradable molding may therefore be opened and closed again several times, without there being the danger of a rupturing or tearing of the connection element.

The molding according to the invention, which consists of at least one connection element and two mold elements, may be produced by means of honeycomb baking technology. The baking molds for the two mold elements, for example the two halves of a hamburger box, are in this case connected to one another by a strip- or ribbon-shaped web. On the charging of a bakeable material and the closing of the baking mold the bakeable material spreads out with the evaporation of water and as a result of the pressure increase uniformly in the backing mold. During said baking operation the strip- or ribbon-type web is then filled uniformly with baking material and a molding according to the invention produced by baking.

Due to the simple geometry of the web, i.e. to the strip- or ribbon-type shape of the connection element, the Moldings according to the invention may be produced with a high throughput without production faults occurring with the connection element. In addition, the baking mold may be made of the same material throughout, for example metal or steel. This makes a cheap and simple manufacture of the baking molds possible. In addition, said baking molds exhibit very high durability and are virtually failure-free.

The choice of the length and the thickness of the connection element may be influenced by various factors, such as for example the size of the mold elements to be connected to one another. In addition, the fiber content in the bakeable material, the length and width as well as the nature of the fibers used may have an influence on the chosen length and thickness of the connection element.

According to a preferred embodiment the first and the second external faces of the connection element each have a substantially continuous surface.

During the baking of the bakeable material there forms, when a temperature of 100° C. to 200° C., preferably of 150° C., is set in the baking mold, on the outsides of the molding a kind of skin which exhibits a substantially continuous surface. Said continuous surface or skin possesses an increased toughness and contributes to the stabilization of the connection element. Said continuous surface is further highly flexible by virtue of its "skin-like" character.

It is presumed that said skin forms on the surface of the molding because of the high heat transfer from the baking mold to the baking material coming into direct contact with the baking mold at the start of the baking process. The water vapour formed during the baking process in general produces a foaming of the bakeable material. In the case of the baking material coming directly into contact with the baking mold the pores and channels produced in the surface area presumably collapse and therefore condense to form the continuous surface with a skin-like character.

Preferably the connection element is sufficiently flexible that the mold elements connected to one another may be arranged above one another. Hence, for example, the two halves of a hamburger case may be closed without a kink formation or a substantial kink formation occurring. Preferably the connection element is flexible by up to 180° without the formation of a kink occurring.

Because of the toughness of the skin formed on the surfaces of the two-dimensional connection element no tearing or rupturing of the connection element occurs, however, even with a kink formation.

In addition it is preferable that the first and the second outer faces of the connection element are separated from one another by an area with a pore and/or channel structure.

In said embodiment there is arranged between the outer faces an area which possesses a structure of a cellular nature. For the purpose of the invention it is preferable that said area is of thin construction. Preferably the connection element has overall a thickness which is less than the thickness or wall thickness of the mold elements which are connected to one another by means of the connection element.

The thinner the construction of the area between the outer faces is, the lesser is the probability of a tearing or rupturing of the connection element. An exact specifying of the thickness of said area of a cellular nature is not possible precisely, since various factors, such as for example the moisture content of the connection element, the ageing temperature of the molding or the application of a coating increasing the flexibility of the connection element, have an influence on the flexibility of the connection element.

An increased residual moisture in the molding or connection element of for example 4 to 15%, preferably of 10%, produces an increase in the flexibility.

According to a further preferred embodiment the area with a pore and/or channel structure which separates the first and second outer faces of the connection element comprises a central area as well as an edge area bordering the first and second outer faces respectively, wherein the diameter of the pores and/or channels in the central area is greater than in the edge areas bordering the first and second outer faces respectively.

The pores or channels with greater diameter in the central area, referred to the diameter of the pores or channels in the edge areas bordering the outer sides of the connection element, produce an increased flexibility of the connection element. The arrangement of pores or channels with great diameter in the central area prevents the formation of a closely meshed cellular structure in the central area, which can lead to a greater rigidity, i.e. to a lesser flexibility of the connection element.

The formation of a central area which includes pores or channels of greater diameter is discernible when a cross-section of the connection element according to the invention is viewed with the naked eye.

It is furthermore preferable that the area separating the first and second outer faces of the connection element has a substantially homogeneous structure.

In said embodiment the formation of a clearly defined central area with pores or channels of greater diameter, which can be discerned with the naked eye, is not involved. Instead, in said embodiment the outer faces of the connection element with a skin-like character lie virtually on top of one another. It can be discerned by eye or under the microscope that the outer faces with a skin-like character are separated by a very thin area of substantially homogeneous appearance. Said area of homogeneous appearance comprises pores or channels whose diameters roughly match one another for the most part.

In said embodiment of the invention the properties of the connection element are determined substantially by the properties of the continuous outer faces with a skin-like character. Consequently a connection element according to said embodiment is particularly flexible. The fact that a diminution in the thickness of the connection element, so that the outer faces are now separated from one another only by a very thin area with a substantially homogeneous cell-like structure, leads to an improvement in the stability and flexibility of the connection element was very surprising and unexpected.

In addition, it was also found with said embodiment that if a bakeable material of starch, cellulose fibers and water, as already described above, is used in a connection element having a thin area with a substantially cell-like structure of substantially homogeneous appearance, the fiber content, referred to the mean fiber content in the mold elements, may be reduced.

Astonishingly, connection elements which have a reduced or virtually zero fiber content are very stable and flexible. This is presumably attributable to the fact that the stability and flexibility are determined substantially by the continuous surfaces with a skin-like character.

In addition, it is preferable that the connection element has a thickness which is defined in terms of the distance of the first outer face from the second outer face inclusive, in a range of about 0.1 mm to about 1.5 mm, preferably about 0.25 mm to about 1.2 mm.

It has been found that connection elements which have a thickness in the ranges given above have a sufficient stability and flexibility. Particularly preferably the connection element has a thickness of about 0.4 mm to about 1.0 mm, more preferably of about 0.6 mm to about 0.9 mm.

According to a further preferred embodiment the thickness of the connection element decreases continuously from the mutually opposite end areas to the center of the connection element without the formation of notch or fold depressions or cutouts.

The thickness of the connection element does not have to be constant over the whole length of the connection element. For example, the thickness of the connection element may exhibit in the end areas a thickness which matches or almost matches the wall thickness of the mold elements. For example, the thickness of the connection element may come to 1.0 mm to 1.2 mm in the end areas and 0.7 mm to 1.0 mm in the center of the connection element. Other thickness ranges may naturally also be chosen. It is critical, however, that no notches, folds or dents are contained in the connection element.

It is preferable that the connection element has a length which is defined in terms of the distance between the mutually opposite end areas of the connection element, in a range of about 0.25 cm to about 6 cm, preferably of about 0.5 cm to 3 cm.

The ranges given have been found to be very suitable. Lengths of more than 6 cm may naturally also be used, if it is accepted that the connection element projects laterally for example in the case of a closed container. Against the background that the connection element should not project substantially laterally in the case of a closed container, shorter lengths are as a rule preferred, e.g. in a range of 0.6 cm to 1.5 cm.

It is preferable that the mold elements are connected to one another by means of a connection element, wherein the connection element has at each of the mutually opposite end areas a width which matches or largely matches the width of the mold element connected to the particular end area.

According to said preferred embodiment the molding comprises an individual connection element which extends across the whole width or almost the whole width of the molding. For example, the two halves of a hamburger case are therefore almost completely connected continuously to one another across the width of the hamburger case.

In a further embodiment of the present invention the mold elements are connected to one another by more than one connection element, wherein the width of the end area of each connection element extends in each case across part of the width of the mold element connected to the respective end area.

In said embodiment, for example, the two halves of a hamburger case may be connected to one another by more than one connection element, for example by two or three connection elements. Said plurality of connection elements have a width which extends across only one part of the width of the mold element, i.e. in this case of the two halves of the hamburger case. In said embodiment it is therefore possible with advantage to provide two or three connection elements in the form of connecting straps and hence to save on material. In addition, the arrangement of two or more connection elements leads to a different aesthetic impression.

Preferably, if two connection elements are used, the latter are each arranged in the outer area of the width of the mold elements.

It is furthermore preferred that the width of the one or more connection element(s) tapers from the end areas to the center of the one or more connection elements(s) respectively.

According to said embodiment the connection element may exhibit at the end with which it is connected to the mold element a greater width than in the center of the connection element. Hence the width of the connection element decreases starting at the extension limb to the first mold element up to the center of the connection element and subsequently increases again up to the extension limb on the second mold element.

In this way first of all a very reliable mounting of the connection element on the mold elements is ensured. Secondly, the area of the mold element which is subjected to the strongest bending during the use of the molding, namely the area lying in the center of the connection element, exhibits a smaller width and hence permits a closing of the molding with less force application, since the restoring force is smaller. In addition, a particular aesthetic impression is also produced in this way and at the same time material is saved on. Said construction of the connection element may be obtained if only one or else several connection elements are provided between the mold elements.

In addition, it is preferable that the connection element is provided on at least one outer face at least partially with a coating.

The application of a coating to a connection element may take place on one outer face or else on both outer faces. The flexibility or stability of the connection element may in certain cases be further increased by said measure. Such a measure may be of advantage with moldings that are opened and closed again frequently.

There may be used for this any suitable coating which is compatible with a starch-containing composite material and increases the flexibility of the connection element.

Suitable coating formulations include, without limitation, a plasticizing composition comprising mainly aliphatic polyester and polyurethane available under the trade name SENOLITH from Weilburger Lackfabrick GmbH & Co., Germany; and a dispersion of polyester-polyurethane and polyether-polyurethane available under product No. 076-090-05840 from Kristall-Lack H. Müller GmbH & Co. KG, also of Germany. These coating formulations are substantially free of polyalcohols.

It is furthermore preferable that at least one mold element is constructed as a container.

The container may here be a hamburger case, a bowl, a cup, a tumbler, a plate, a dish, a pot, etc.

Any container which is suitable for containing beverages, meals, foodstuffs, fruit, flowers, etc., as well as objects of any kind, is understood by the term mold element according to the present invention.

It is furthermore preferable that at least one mold element is constructed as a cover.

The cover may be constructed as a conventional lid or else also as part of a container, such as in the case of a hamburger case for example.

According to the invention the at least two mold elements are connected to one another by at least one connection element in such a way that the latter may be arranged above one another. This means that if a first mold element is constructed as a container and a second mold element as a cover, then at least one connection element is arranged between container and cover in such a way that the container may be closed with the cover without the connection between container and cover having to be loosened.

Preferably the connection element is constructed in the form of a strip or ribbon.

The object on which the invention is based is furthermore achieved by a biologically degradable molding (1) based on a starch-containing composite material and having at least two mold elements (2,3) connected to one another by at least one connection element (4), wherein the connection element (4) extends substantially two-dimensionally and is connected at each of two mutually opposite end areas to a mold element (2,3), wherein the connection element (4) is made of a starch-containing and flexible composite material and, when the two mold elements (2,3) are arranged above one another, assumes a substantially continuously bent shape, preferably without kink formation.

For example, when the molding according to the invention is constructed in the form of a hamburger case, the connection element assumes, with the hamburger case in the closed state, preferably a loop-type arrangement. This means that the connection element is bent by up to about 180°, preferably with the formation of a semicircular arch. Depending on the length of the connection element, a kink formation may also occur in certain cases, which does not however take place along a predetermined fold or a predetermined cutout. Extremely advantageously the molding according to the invention may also be opened and closed several times when kinks occur in the connection element, without a rupturing or tearing occurring in the area of the connection element.

The invention will be explained below with reference to the attached FIGS. 1 to 3.

FIG. 1 shows a perspective view of an exemplifying embodiment of the invention. A hamburger case (1) can be seen, which incorporates a receiving container (2) and a covering container (3), in the opened state. The receiving container (2) and the covering container (3) are connected to one another by a strip- or ribbon-like two-dimensional connection element (4) which does not comprise any notches or folds. The hamburger case (1) is closed by the covering container (3) being drawn over the receiving container (2) along the arrow shown and being arranged on the latter. In so doing the connection element (4) is bent by about 180°, without a tearing or rupturing of the connection element (4) occurring.

The hamburger case according to the invention may be opened and closed again several times.

Figure 2:
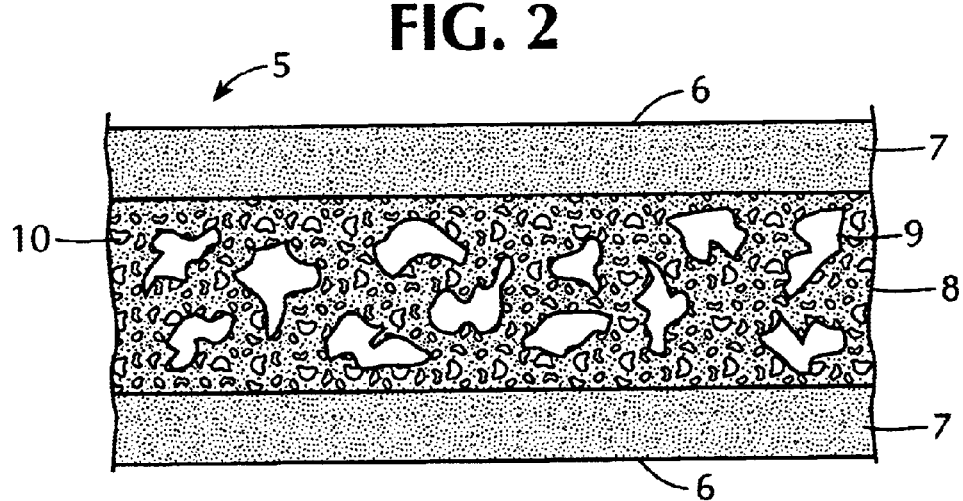
FIG. 2 depicts a cross-sectional view of a molding according to an embodiment of the invention comprising outer faces and an area having a pore or channel structure.

FIG. 2 shows a diagrammatic representation of an exemplifying connection element (5) in cross-section. The connection element comprises along the two outer faces (6) a thin skin (7) with largely continuous surface. The two outer faces (6) are separated from one another by an area (8) which contains pores or channels (9,10) of varying diameter. It can be seen that pores or channels (9) of greater diameter are arranged in the center of the area (8). In the edge areas bordering the outer faces (6) are arranged predominantly pores or channels (10) with smaller diameters. The representation is not to scale.

Figure 3:
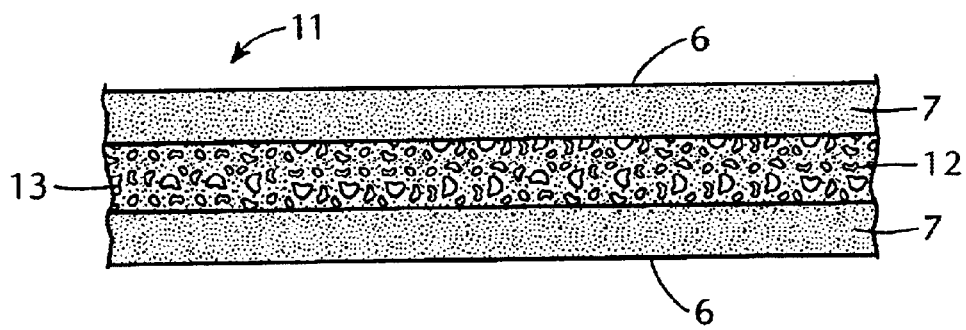
FIG. 3 depicts a cross sectional view of a molding according to an embodiment of the invention.

FIG. 3 shows a further diagrammatic representation of an exemplifying connection element (11) in cross-section. The connection element comprises along the two outer faces (6) a thin skin (7) with largely continuous surface. The two outer faces (6) are separated from one another by a largely homogeneous area (12). The homogeneous area (12) comprises pores or channels (13) with roughly equal diameters. The representation is not to scale.

Figure 4:
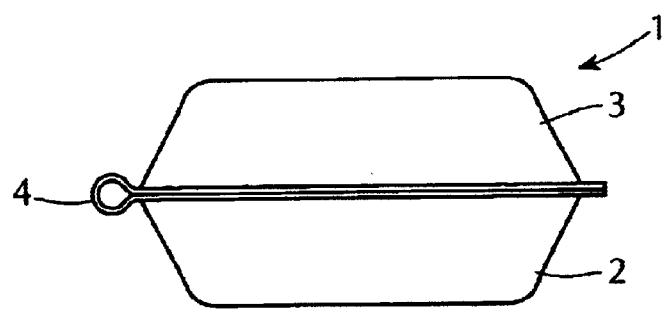
FIG. 4 depicts a side view of a container according to an embodiment of the invention in a closed state.

FIG. 4 shows a diagrammatic representation in side view and in the closed state of the hamburger case (1) shown by way of example in FIG. 1. The covering container (3) is here arranged above the receiving container (2). In the closed state the connection element (4) connecting the receiving container (2) and the covering container (3) forms a continuous semicircular arch, which may also exhibit kinks in certain cases.

The foregoing description of preferred embodiments is not intended to be limiting of the invention, which is defined by the following claims.

What is claimed is:

1. Biologically degradable molding based on a starch-containing composite material and having at least two mold elements connected to one another by at least one connection element, wherein the connection element extends substantially two-dimensionally and is connected at each of two mutually opposite end areas to a mold element, and wherein the connection element comprises a first outer face with a substantially continuous skin and a second outer face with a substantially continuous skin, wherein the first and second outer faces are separated by a porous structure, and wherein the connection element is made of a starch-containing and flexible composite material and is free of notch- or fold-depressions or cutouts.

2. Biologically degradable molding according to claim 1, wherein the porous structure which separates the first and second outer faces of the connection element comprises a central area as well as an edge area bordering the first and second outer faces respectively, wherein the diameter of the pores or channels in the central area is greater than in the edges areas bordering the first and second outer faces respectively.

3. Biologically degradable molding according to claim 1, wherein the area separating the first and second outer faces of the connection element has a substantially homogeneous structure.

4. Biologically degradable molding according to claim 1, wherein the connection element has a thickness which is defined in terms of the distance of the first outer face from the second outer face inclusive, in a range from about 0.1 mm to about 1.5 mm.

5. Biologically degradable molding according to claim 4, wherein the thickness of the connection element decreases continuously from the mutually opposite end areas to the center of the connection element without the formation of notch or fold depressions or cutouts.

6. Biologically degradable molding according to claim 1, wherein the connection element has a length which is defined in terms of the distance between the mutually opposite ends of the connection element, in a range of about 0.25 cm to about 6 cm.

7. Biologically degradable molding according to claim 1, wherein the mold elements are connected to one another by a connection element, wherein the connection element has at each of the mutually opposite end areas a width which matches or largely matches the width of the mold element connected to the respective end area.

8. Biologically degradable molding according to claim 1, wherein the mold elements are connected to one another by more than one connection element wherein the width of the end area of each connection element extends in each case across part of the width of the mold element connected to the respective end area.

9. Biologically degradable molding according to claim 7, the width of the one or more connection element tapers in each case from the end areas to the center of the one or more connection element.

10. Biologically degradable molding according to claim 1 wherein the connection element is provided on at least one outer face at least partially with a coating.

11. Biologically degradable molding according to claim 1, wherein at least one mold element is constructed as a container.

12. Biologically degradable molding according to claim 1, wherein at least one mold element is constructed as a cover.

13. The biologically degradable molding of claim 4, wherein the connection element has a thickness in a range between about 0.25 mm to about 1.2 mm.

14. The biologically degradable molding according to claim 6, wherein the connection element has a length in a range from 0.5 cm to about 3 cm.

15. Biologically degradable molding based on a starch-containing composite material and having at least two mold elements connected to one another by at least one connection element, wherein the connection element extends substantially two-dimensionally in the form of a ribbon or strip and is connected at each of two mutually opposite end areas to a mold element, wherein the connection element is made of a starch-containing and flexible composite material having a porous structure with smaller pores toward the structure surface and larger pores toward the structure interior, and when the two mold elements are arranged above one another assumes a substantially continuously bent shape, without kink formation.

16. Biologically degradable molding according to claim 15, wherein the thickness of the connection element decreases continuously from the mutually opposite end areas to the center of the connection element without the formation of notch or fold depressions or cutouts.

17. Biologically degradable molding according to claim 15, wherein the connection element has a length which is defined in terms of the distance between the mutually opposite ends of the connection element, in a range of about 0.25 cm to about 6 cm.

18. Biologically degradable molding according to claim 15, wherein the mold elements are connected to one another by a connection element, wherein the connection element has at each of the mutually opposite end areas a width which matches or largely matches the width of the mold element connected to the respective end area.

19. Biologically degradable molding according to claim 15, wherein the mold elements are connected to one another by more than one connection element wherein the width of the end area of each connection element extends in each case across part of the width of the mold element connected to the respective end area.

20. Biologically degradable molding according to claim 15, wherein the connection element is provided on at least one outer face at least partially with a coating.

21. The biologically degradable molding of claim 15, wherein the connection element has a thickness in a range between about 0.25 mm to about 1.2 mm.

* * * * *